April 26, 1927.

H. S. STEINBRECHT

STABILIZER FOR AIRCRAFT

Filed May 26, 1926

Hans S. Steinbrecht
INVENTOR

BY Victor J. Evans
ATTORNEY

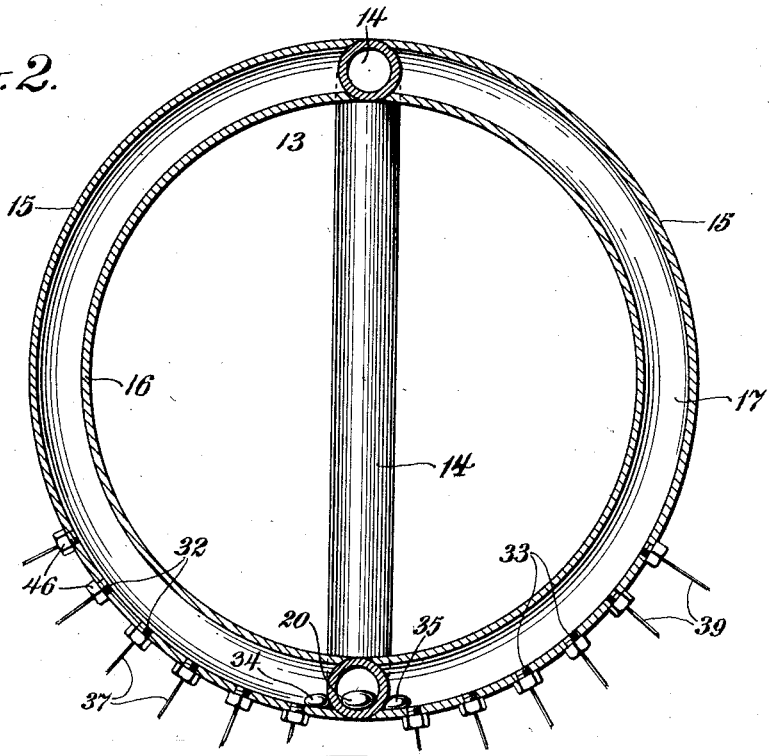
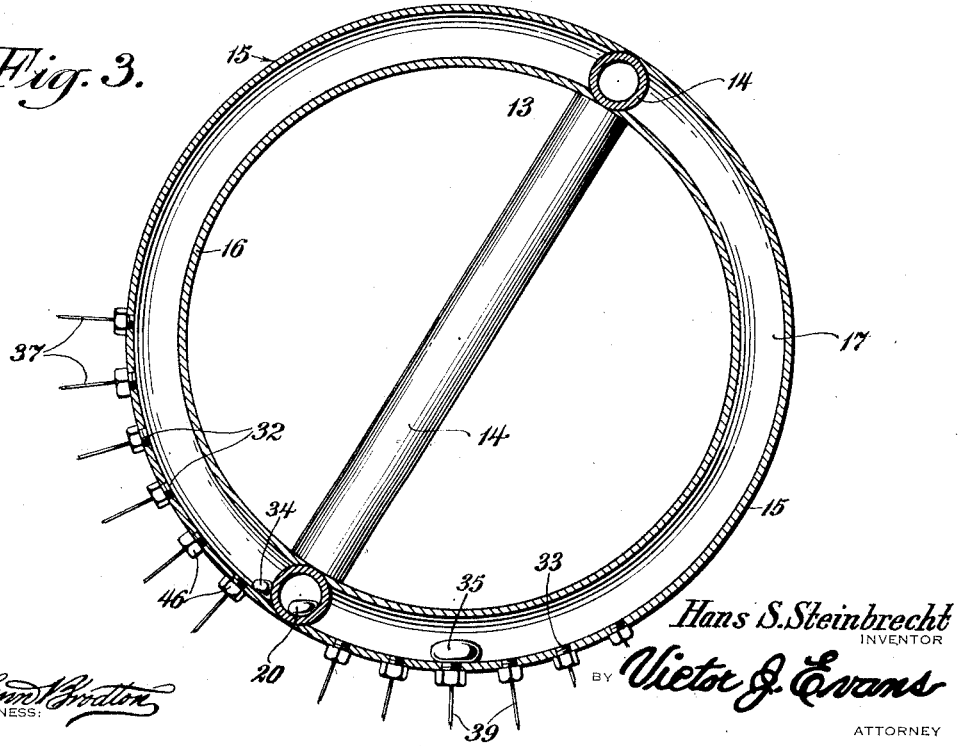

April 26, 1927. 1,626,567

H. S. STEINBRECHT

STABILIZER FOR AIRCRAFT

Filed May 26, 1926   3 Sheets-Sheet 3

Hans S. Steinbrecht
INVENTOR

BY Victor J. Evans
ATTORNEY

WITNESS

Patented Apr. 26, 1927.

1,626,567

UNITED STATES PATENT OFFICE.

HANS S. STEINBRECHT, OF NEW YORK, N. Y.

STABILIZER FOR AIRCRAFT.

Application filed May 26, 1926. Serial No. 111,829.

This invention relates to improvements in stabilizers for aircraft.

The principal object of the invention is the provision of a device adapted to be mounted in an aircraft at the center of gravity thereof for automatically controlling the operation of the ailerons and elevator for maintaining the aircraft in perfect flying position at all times.

Another object of the invention resides in stabilizers for aircraft which automatically rights the craft irrespective of the operator, and regardless of whether the deviation is lateral or longitudinal of the axis of the craft.

A further object of the invention is the provision of electro-magnetic means for checking the undue movements of an aircraft in flight, and which means is selective20 ly controlled by the angular position of the aircraft with respect to the center of gravity.

With these and other objects in view, the invention resides in certain novel construc25 tion and combination and arrangement of parts, the essential features of which are hereinafter fully described, are particularly pointed out in the appended claims, and are illustrated in the accompanying drawing, in which:—

Figure 1 is a diagrammatic view of my improved stabilizer showing the same in operative relation with the control parts of an aircraft.

Figure 2 is a vertical sectional view through one of the electro-magnetic control devices.

Figure 3 is a similar view but showing the same at an angle with respect to the center of gravity.

Figure 1:
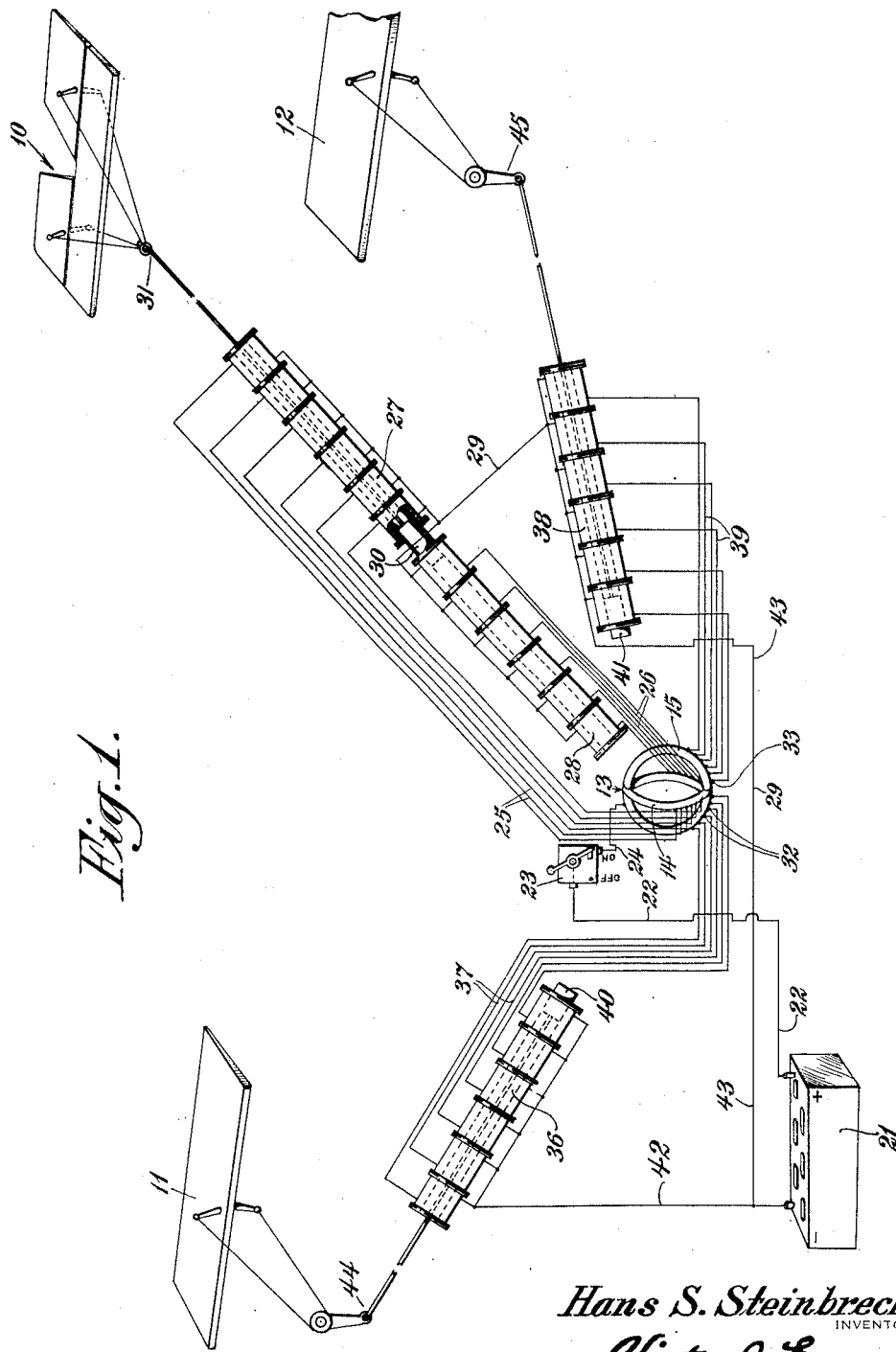
Figure 4:
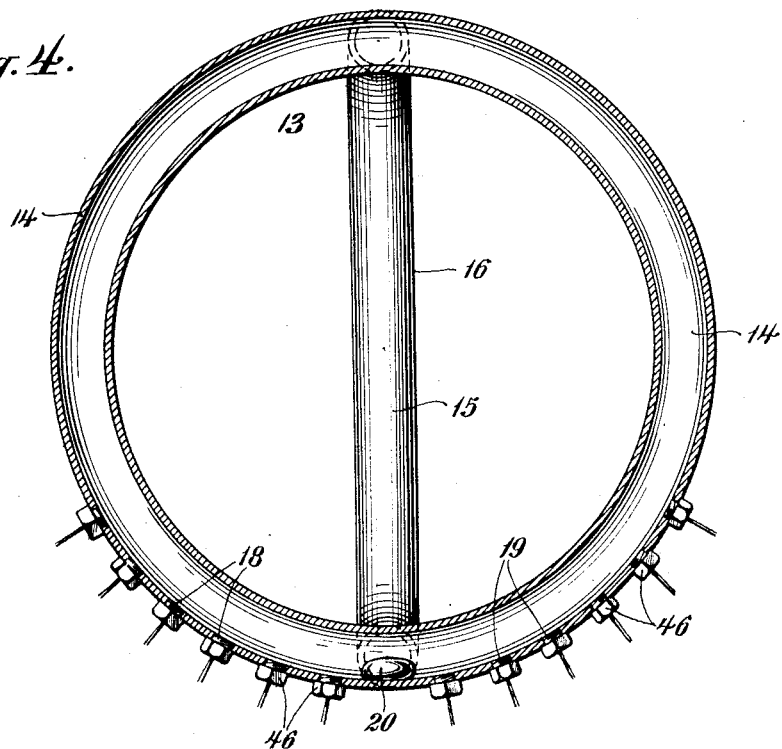
Figure 4 is a view similar to Figure 2 but taken at right angle thereto.
Figure 5:
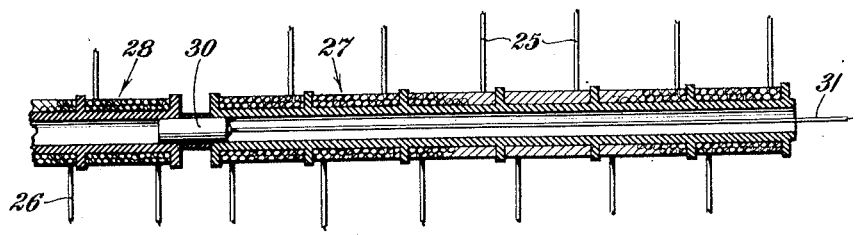
Figure 5 is a vertical longitudinal sectional view through one of the series of the solenoids.
Figure 6:
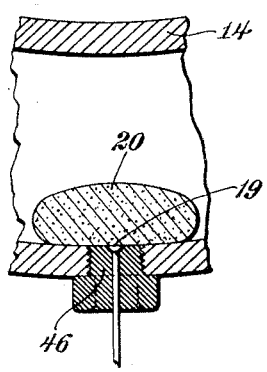
Figure 6 is an enlarged detail sectional view of a portion of the make and break device.

Referring more particularly to the draw50 ings, the reference numeral 10 designates the elevator of an aircraft, while 11 and 12 respectively designate the right and left ailerons thereof, which are of course swingingly mounted in the respective wings. It will be appreciated that at present it is the practice of the operator of an aircraft to manually control these parts to keep the aircraft in perfect position during flight, and he must always be ready to actuate the respective parts upon any deviation of the craft, due to air pockets and other peculiar air conditions, to prevent crashing to the earth usually resulting in injury to the occupants of the aircraft and destruction to the aircraft itself. It is therefore my object to automatically and selectively control these parts upon the deviation of the aircraft in any direction.

In the center of gravity of the aircraft, I mount a circuit make and break device 13 which comprises a pair of annular tubular rings 14 and 15 of suitable material, and which rings are mounted at right angle to the axis of each other, with the ring 14 passing transversely through the ring 15 at diametrically opposite points, thereby dividing the interior of said ring 15 into two separate compartments 16 and 17, respectively disposed on opposite sides of its axial center.

The ring 14 is respectively provided on opposite sides of its axial center with series of spaced insulated contacts 18 and 19, while a drop of mercury 20 is freely movable within the ring and normally rests between the two series of contacts. The rings are arranged in circuit with a source of energy such as a battery 21, from one pole of which a wire 22 leads to a manual switch 23. A wire 24 connects the switch with the rings 14 and 15 whereby upon bridging of any one or more contacts by the mercury, the respective circuits presently to be described are closed.

Correlated with the respective contacts 18 and 19 are wires 25 and 26 which lead to the respective sets of solenoids 27 and 28 arranged in axial longitudinal alignment. A return wire 29 leads from the solenoids to the opposite pole of the battery, thereby providing separate circuits for the solenoids for a purpose to be presently described. Slidable longitudinally within the solenoids is a core 30 which is normally disposed between the adjacent solenoids 27 and 28 of the respective sets, and at which time the mercury 20 is intermediate the series of contacts 18 and 19. The core 30 is connected to an elevator actuating means 31 whereby movement of the core in opposite directions will impart opposite tilting movement to the elevator 10. From the description thus far, it will be seen that should the aircraft accidentally tilt forward the mercury 20 will first bridge the first contact 19 to close the circuit with the first solenoid 27, thus moving the core 30 into the center of the magnetic field of said solenoid, causing a pull upon the elevator actuating mechanism, thereby lifting the elevator. Should the tilting angle of the aircraft increase, the same will consecutively bridge the contacts 19 to energize the respective solenoids thus gradually moving the core toward the outermost solenoid and consequently increasing the tilting movement of the elevator until the same is automatically restored to an even flying plane in alignment with the center of gravity. Briefly, the core is moved to the center of the magnetic field of the energized solenoids, irrespective of whether one or more of the solenoid circuits are closed by the mercury.

The ring 15 is provided with a series of contacts 32 and 33 on opposite sides of its axial center, while drops of mercury 34 and 35 are respectively enclosed within the ring for engagement with the contacts 32 and 33. The contacts 32 are respectively connected with a series of axial aligned solenoids 36 by wires 37, while the series of contacts 33 are respectively connected with a similar series of solenoids 38 connected by wires 39. Sliding cores 40 and 41 are respectively arranged within the series of solenoids 36 and 38 and are normally disposed of the inner end solenoid. The solenoids 36 are connected to the battery 21 by a wire 42, while a wire 43 leads from the battery to the solenoids 38. The cores 40 and 41 are respectively connected to the ailerons 11 and 12 by actuating mechanisms 44 and 45. From the foregoing description, it will be seen that should the aircraft tilt in a lateral direction, as for instance toward the right, the mercury 35 will bridge the first contact 33, closing the circuit through the first solenoid 38 and will consecutively energize the solenoids to move the core 41 to the center of its magnetic field, which in turn operates the aileron control mechanism to tilt the aileron thus righting the aircraft to an even keel after which the mercury automatically returns to its neutral position against the ring 14, which ring as previously mentioned passes through the ring 15. Of course the solenoids 38 are consecutively energized, depending upon the degree of angle which the aircraft may assume. The same operation takes place should the plane tilt toward the left at which time the solenoids 36 are energized by reason of the mercury 34 engaging the contact 32 to close the respective circuits, and which in turn operates the aileron control mechanism 44 for moving the aileron 11.

In order to properly insulate the contacts 18, 19, 32 and 33 from the respective rings 14 and 15, I provide bushings 46 of insulating material, which thread into the walls of the rings and through which bushings the wires pass to the interior of the rings for contact by the respective drops of mercury.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In combination with the elevator of an aircraft, actuating means therefor, a hollow annular ring adapted to be mounted in axial alignment with the center of gravity of an aircraft, two sets of contacts carried by said ring and insulated therefrom, each set being respectively provided on opposite sides of the axial center of said ring, two sets of solenoids arranged in axial alignment with each other and arranged in electric circuits with the respective sets of contacts, a sliding core normally positioned between the sets of solenoids and operatively connected with said actuating means, and a conductor element movable within said hollow ring and responsive to a longitudinal deviation of said ring with respect to its axial center for closing the circuits to energize the respective solenoids to move said core into the center of the magnetic field set up by the energized solenoids, a pair of ailerons, individual actuating means for each of said ailerons, a second annular ring stationarily mounted at right angle to the axis of said first ring, two sets of contacts on said ring and forming a unitary body therewith, each disposed on opposite sides of its axial center and insulated therefrom, a set of axially aligned solenoids arranged in an electric circuit with each set of contacts, a sliding core movable through the solenoids of each set and respectively connected with the individual actuating mechanism, and conductor elements movable within said last hollow ring on opposite sides of its axial center for engagement with the contacts of the respective sets for closing the circuits to energize the respective solenoids whereby to move the respective cores into the center of the magnetic field set up by the energized solenoids substantially as and for the purpose specified.

2. In a stabilizer for aircraft, a unitary circuit make and break device including a pair of hollow rings, each disposed at right angle to each other, sets of contacts disposed on opposite sides of the axial center of said rings, and conductor elements movable within said hollow rings and automatically responsive to any movement of the same with respect to the center of gravity for engagement with the respective contacts.

In testimony whereof I have affixed my signature.

HANS S. STEINBRECHT.